United States Patent
Barbe et al.

(10) Patent No.: US 12,524,911 B2
(45) Date of Patent: *Jan. 13, 2026

(54) CALIBRATION METHOD OF A PORTABLE ELECTRONIC DEVICE

(71) Applicant: Essilor International, Charenton-le-Pont (FR)

(72) Inventors: Christophe Barbe, Clichy (FR); David Encaoua, Carrieres-sur-Seine (FR); Hui Li, Clichy (FR)

(73) Assignee: Essilor International, Charenton-le-Pont (FR)

( * ) Notice: Subject to any disclaimer, the term of this patent is extended or adjusted under 35 U.S.C. 154(b) by 196 days.

This patent is subject to a terminal disclaimer.

(21) Appl. No.: 18/548,629

(22) PCT Filed: Mar. 4, 2022

(86) PCT No.: PCT/EP2022/055643
§ 371 (c)(1),
(2) Date: Sep. 1, 2023

(87) PCT Pub. No.: WO2022/184928
PCT Pub. Date: Sep. 9, 2022

(65) Prior Publication Data
US 2024/0159621 A1   May 16, 2024

(30) Foreign Application Priority Data
Mar. 4, 2021 (EP) .................................. 21305257

(51) Int. Cl.
*G06T 7/80* (2017.01)
*G01M 11/02* (2006.01)
(Continued)

(52) U.S. Cl.
CPC .......... *G06T 7/80* (2017.01); *G01M 11/0207* (2013.01); *G01M 11/0264* (2013.01); *G06T 7/74* (2017.01);
(Continued)

(58) Field of Classification Search
CPC .... G06T 7/80; G06T 7/74; G06T 7/73; G06T 11/00; G06T 2207/10016;
(Continued)

(56) References Cited

U.S. PATENT DOCUMENTS 8,786,707 B1    7/2014   Ettinger
8,860,818 B1 *  10/2014  Sachs .................. H04N 23/633
                                                        348/187
(Continued)

FOREIGN PATENT DOCUMENTS

WO   WO 2017/123523 A1   7/2017
WO   WO 2017/125902 A1   7/2017
WO   WO 2020/081871 A1   4/2020

OTHER PUBLICATIONS

International Search Report & Written Opinion issued Jun. 20, 2022 in PCT/EP2022/055643, filed on Mar. 4, 2022, 15 pages.
(Continued)

*Primary Examiner* — Tarifur R Chowdhury
*Assistant Examiner* — Carlos Perez-Guzman
(74) *Attorney, Agent, or Firm* — Oblon, McClelland, Maier & Neustadt, L.L.P.

(57) ABSTRACT

A calibration method for determining parameters of a portable electronic device which includes an image acquisition module to be used to determine parameters of a user and a display, where the method includes providing a known pattern, using an image of the known pattern from the image acquisition module of the portable electronic device from a first position, providing at least one indication to the user to
(Continued)

move the portable electronic device relative to the known pattern to at least a second position different from the first position, taking an image of the known pattern in the second position using the image acquisition module, and processing the image of the known pattern taken from the second position to determine at least the parameters of the portable electronic device comprising the image acquisition module used to take the image.

14 Claims, 4 Drawing Sheets

(51) Int. Cl.
 *G06T 7/73* (2017.01)
 *G06T 11/00* (2006.01)
(52) U.S. Cl.
 CPC .... *G06T 11/00* (2013.01); *G06T 2207/10016* (2013.01); *G06T 2207/10152* (2013.01); *G06T 2207/30204* (2013.01); *G06T 2207/30244* (2013.01)
(58) Field of Classification Search
 CPC . G06T 2207/10152; G06T 2207/30204; G06T 2207/30244; G06T 2200/24; G01M 11/0207; G01M 11/0264; A61B 3/0083; H04N 17/002
 See application file for complete search history.

(56) References Cited

U.S. PATENT DOCUMENTS

| | | |
|---|---|---|
| 2015/0341618 A1* | 11/2015 | He .................. G06T 7/0012 348/47 |
| 2017/0202450 A1 | 7/2017 | Carrafa et al. |
| 2017/0336284 A1 | 11/2017 | Goldberg et al. |
| 2018/0306670 A1 | 10/2018 | Goldberg et al. |
| 2021/0038069 A1 | 2/2021 | Carrafa et al. |

OTHER PUBLICATIONS

Bo et al. "Practical Camera Calibration System on Mobile Platforms", International Journal of Control and Automation, vol. 7, No. 8, 2014, pp. 257-266.

* cited by examiner

CALIBRATION METHOD OF A PORTABLE ELECTRONIC DEVICE

FIELD OF THE DISCLOSURE

The disclosure relates to calibration method for determining parameters of a portable electronic device comprising an image acquisition module to be used to determine parameters of a user, and a display configured to display the images.

BACKGROUND OF THE DISCLOSURE

Usually, a person wishing to have an optical equipment goes over to an eye care practitioner.

The determination of the wearer's prescription and fitting data may require carrying out complex and time-consuming measurements. Such measurements usually require complex and costing material and qualified personnel to be carried out.

However, recent developments allow using portable electronic device, such as a smartphone to determine some optical parameters of a person.

An example of the use of portable electronic device to determine an optical parameter of a lens of eyewear adapted for a person is disclosed in WO 2019/122096.

The use of a portable electronic devices to determine optical parameters requires knowing some of the characteristic of the portable electronic device.

The variety of different portable electronic devices available requires having a calibration protocol that is easy to implement and allows determining parameters of a portable electronic devices to determine if such device may be used to determine specific optical parameters and the key characteristic of such portable electronic device that are required to determine the optical parameters.

The calibration method of the disclosure is an alternative to a characterization process that is usually done in a laboratory with specific metrological equipment. Such characterization process is often done as a conclusion of a manufacturing process of the electronic device and renewed regularly to maintain the precision of the device.

Such characterization process requires specific metrological equipment and highly trained professional and therefore may not be carried out on a large scale for a great variety of portable electronic devices.

The existing smartphone application uses many of the integrated hardware sensors to allow a simple and precise determination of the parameters, for example lens fitting. Such applications are usually used on pre-qualified smartphones which have been individually calibrated in a laboratory. This calibration can be done on a single sample of a given model if the dispersion of the characteristic parameters is known to be low enough. Otherwise, the calibration needs to be done on each smartphone individually.

Therefore, there is a need to a calibration method of a portable electronic device that can easily implemented by an untrained user and for calibrating any portable electronic device without requiring the use of specific metrological equipment.

One object of the present disclosure is to provide such calibration method.

SUMMARY OF THE DISCLOSURE

To this end, the disclosure relates to a calibration method for determining parameters of a portable electronic device comprising an image acquisition module to be used to determine parameters of a user and a display, wherein the method comprises:
  providing a known pattern,
  using an image of the known pattern from the image acquisition module of the portable electronic device from a first position,
  providing at least one indication to the user to move the portable electronic device relative to the known pattern to at least a second position different from the first position,
  taking an image of said known pattern in the second position using said image acquisition module,
  processing the image of the known pattern taken from the second position to determine at least parameters of the portable electronic device comprising the image acquisition module used to take the image.

Advantageously, the calibration method of the disclosure is an assisted calibration method. Providing indications to the user, the calibration method of the disclosure relies as little as possible on the operator and does not require any specific knowledge.

Advantageously, this method enables to determine at least a parameter of the portable electronic device, and more particularly a parameter of the image acquisition module of said portable electronic device, for example the focal length. This is even more advantageous taking into consideration that the value of this parameter might not be provided by the portable electronic device manufacturer or that the value provided by the portable electronic device manufacturer or an operating system running the portable electronic device, or an application programming interface may not be accurate enough.

When said parameter is provided by the manufacturer as an image metadata, the value of the parameter provided in said metadata might not be in adequation with the real value of the parameter of the portable electronic device comprising the image acquisition module used to take the image. This renders complex the exploitation of said data for precise measurement, for example determining the fitting parameters or the interpupillary distance.

Advantageously, the method of the disclosure enables to provide a more accurate value of the parameter of the portable electronic device comprising the image acquisition module used to take the image, than the one provided by the manufacturer as metadata.

Advantageously said method enables to determine accurate value of the parameter of the portable electronic device comprising the image acquisition module, wherein the image acquisition module comprises movable. These movable parts render complex the determination of accurate value of the parameter of the portable electronic device comprising the image acquisition module.

According to further embodiments of the optical device according to the disclosure which can be considered alone or in combination:
  the method further comprises prior to taking the image of said the known pattern in the second position checking stability of the portable electronic device, for example using pose estimation; and/or
  the method further comprises repeating the steps of providing at least one indication to the user to move with the portable electronic device to at least a different position and taking an image of the said known pattern from at least two, for example three, different positions; and/or the distance between the portable electronic device and the known pattern is substantially the same when taking multiple images of said known pattern in the different positions; and/or the method further comprises comprising processing in real-time each image of the known pattern from the image acquisition module to determine the at least one indication to be provided to the user to move the portable electronic device to a different position; and/or the indication provided to the user comprises a rotation indication and/or a translation indication; and/or the translation indication comprises an indication of which direction the user is to move the portable electronic device; and/or the rotation indication comprises an indication of if the orientation of the portable electronic device is to be changed; and/or the display is adapted to display images acquired by the image acquisition module in real-time and the indication provided to the user comprises overlaid indications of the possible next positions; and/or the method further comprises prior to taking an image of the known pattern providing an estimate of the focal value of the image acquisition module; and/or the estimate of the focal value of the image acquisition module is estimated by taking an image of flat known rectangular element with the image acquisition module and processing the image by identifying two vanishing points, assuming that the focal of the image acquisition module is the same in all directions and that the center of the image acquisition module corresponds to the center of the acquired image; and/or the portable electronic device further comprises at least an inertia sensor and/or a magnetic sensor and the method further comprises gathering data using said inertia sensor and/or a magnetic sensor at least when taking an image of the known pattern; and/or the portable electronic device further comprises at least an inertia sensor and/or a magnetic sensor and the method further comprises gathering a data using said inertia sensor and/or a magnetic sensor when having the user move between two positions; and/or the inertia sensor comprises an accelerometer; and/or the portable device comprises an accelerometer, the known pattern is in a fixed position and the method further comprises determining at least one angle, for example angles, between the image acquisition module reference frame and the accelerometer reference frame by:
  receiving the set of images of the known pattern from the image acquisition module from different positions and each image being associated with a gravity data corresponding to the measurement of the gravity by the accelerometer expressed in the accelerometer reference frame,
  determining the at least one angle, for example the angles, between the image acquisition module reference frame and the known pattern reference frame based on the received images of the set of images,
  determining the at least one angle, for example the angles, between the image acquisition module reference frame and the accelerometer reference frame based on the determined at least one angle, for example angles, between the image acquisition module reference frame and the known pattern reference frame and assuming the gravity measured by the accelerometer is the same for each image; and/or the portable electronic device further comprises a flash associated to the image acquisition module and the method further comprises determining the relative position of the flash and a reference point of the image acquisition module, by:
  taking at least one image of the known pattern with the image acquisition module and the associated flash,
  determining the image acquisition module position and orientation in the known pattern reference frame,
  processing the at least one image of the known pattern taken using the flash so as to locate the flash reflection in the image, for example using traditional image processing methods or AI-based methods,
  finding the coordinate of the reflection on the known pattern plan by calculating the intersection of the plan and the epiline of the flash reflection point in the image,
  determining the relative position of the flash and a reference point of the image acquisition module based on the coordinate of the reflection of the flash; and/or the portable electronic device comprises a plurality of image acquisition modules and the method further comprises identify the image acquisition module used during the calibration method by:
  taking an image of the known pattern placed on a reflective plan surface, the user facing the reflective plan surface when taking the image in a position so that the different image acquisition modules appear on the image,
  determining the used image acquisition module by knowing the relative position of the image acquisition module used to take the image and the known pattern and computing the estimate position of the reflect of the image acquisition module on the reflective plan surface; and/or the portable electronic device is to be used to determine at least one of optical fitting parameters of a user, optical parameters of an optical lens, acuity parameters of a user.

the portable electronic device is a smartphone, a personal digital assistant, a laptop, a webcam or a tablet computer; and/or the fitting parameters comprises the distance between the center of both pupil of the eyes of the user; and/or the fitting parameters comprises the distances between the center of each pupil and the sagittal plan of the user, and/or the fitting parameters comprises an indication of the height of the center of each pupil of the user, and/or the fitting parameters comprises indication of the shape of the nose of the user; and/or the fitting parameters comprises indication of the shape of the cheekbone of the user; and/or the optical parameter of the lens comprises the dioptric function of the optical lens; and/or the optical parameter of the lens comprises the optical power in a visual reference zone of the optical lens; and/or the optical parameter of the lens comprises the optical cylinder in a visual reference zone of the optical lens; and/or the optical parameter of the lens comprises the optical cylinder axis in a visual reference zone of the optical lens; and/or the optical parameter of the lens comprises the prism base in a visual reference zone of the optical lens; and/or the optical parameter of the lens comprises the prism axis in a visual reference zone of the optical lens; and/or the optical parameter of the lens comprises the type of optical design of the optical lens; and/or the optical parameter of the lens comprises the transmittance of the optical lens; and/or the optical parameter of the lens comprises the color of the optical lens; and/or the optical parameter of the lens comprises the position of the optical center on the lens.

Another object of the disclosure is a calibration method for determining the at least one angle, for example the angles, between an image acquisition module reference frame and an accelerometer reference frame of a portable electronic device wherein the method comprises:

receiving a set of images of a known pattern from the image acquisition module of the portable electronic device from different positions, the known pattern being in the same spatial position when acquired and each image being associated with a gravity data corresponding to the measurement of the gravity by the accelerometer of the portable electronic device expressed in the accelerometer reference frame, determining the at least one angle, for example the angles, between the image acquisition module reference frame and the known pattern reference frame based on the received pictures of the set of pictures, determining the at least one angle, for example the angles, between the image acquisition module reference frame and the accelerometer reference frame based on the determined at least one angle, for example angles, between the image acquisition module reference frame and the known pattern reference frame and assuming the gravity measured by the accelerometer is the same for each image.

According to further embodiments of the optical device according to the disclosure which can be considered alone or in combination:

the method further comprises prior to receiving a set of images:

providing a known pattern in a fixed position, taking an image of the known pattern in the fixed position using the image acquisition module of the portable electronic device from a first position, providing at least one indication to the user to move with the portable electronic device to at least a second position different from the first position, taking an image of said known pattern in the fixed position using said image acquisition module from the at last second position, processing the images of the known pattern taken from the different positions to determine at least parameters of the image acquisition module used to take the different images; and/or the method further comprises prior to taking the image of said the known pattern in the second position checking stability of the portable electronic device, for example using pose estimation; and/or the method further comprises repeating the steps of providing at least one indication to the user to move with the portable electronic device to at least a different position and taking an image of the said known pattern from at least two, for example three, different positions; and/or the distance between the portable electronic device and the known pattern is substantially the same when taking an image of said known pattern in the different positions; and/or the method further comprises comprising processing in real-time each image of the known pattern from the image acquisition module to determine the at least one indication to be provided to the user to move the portable electronic device to a different position; and/or the indication provided to the user comprises a rotation indication and/or a translation indication; and/or the translation indication comprises an indication of which direction the user is to move the portable electronic device; and/or the rotation indication comprises an indication of if the orientation of the portable electronic device is to be changed; and/or the display is adapted to display images acquired by the image acquisition module in really-time and the indication provided to the user comprises an overlaid indication to be superimpose with indications corresponding to the possible next position; and/or the method further comprises prior to taking an image of the known pattern providing an estimate of the focal value of the image acquisition module; and/or the estimate of the focal value of the image acquisition module is estimated by taking an image of flat known rectangular element with the image acquisition module and processing the image by identifying two vanishing points, assuming that the focal of the image acquisition module is the same in all directions and that the center of the image acquisition module corresponds to the center of the acquired image; and/or the portable electronic device further comprises a flash associated to the image acquisition module and the method further comprises determining the relative position of the flash and a reference point of the image acquisition module, by:

taking at least one image of the known pattern with the image acquisition module and the associated flash, determining the image acquisition module position and orientation in the known pattern reference frame, processing the at least one image of the known pattern taken using the flash so as to locate the flash reflection in the image, for example using traditional image processing methods or AI-based methods, finding the coordinate of the reflection on the known pattern plan by calculating the intersection of the plan and the epiline of the flash reflection point in the image, determining the relative position of the flash and a reference point of the image acquisition module based on the coordinate of the reflection of the flash; and/or the portable electronic device comprises a plurality of image acquisition modules and the method further comprises identify the image acquisition module used during the calibration method by:

taking an image of the known pattern placed on a reflective plan surface, the user facing the reflective plan surface when taking the image in a position so that the different image acquisition modules appear on the image, determining the used image acquisition module by knowing the relative position of the image acquisition module used to take the image and the known pattern and computing the estimate position of the reflect of the image acquisition module on the reflective plan surface; and/or the portable electronic device is to be used to determine at least one of optical fitting parameters of a user, optical parameters of an optical lens, acuity parameters of a user; and/or the portable electronic device is a smartphone, a personal digital assistant, a laptop, a webcam or a tablet computer; and/or the fitting parameters comprises the distance between the center of both pupil of the eyes of the user; and/or the fitting parameters comprises the distances between the center of each pupil and the sagittal plan of the user, and/or the fitting parameters comprises an indication of the high of the center of each pupil of the user, and/or the fitting parameters comprises indication of the shape of the nose of the use; and/or the fitting parameters comprises indication of the shape of the cheekbone of the user; and/or the optical parameter of the lens comprises the dioptric function of the optical lens; and/or the optical parameter of the lens comprises the optical power in a visual reference zone of the optical lens; and/or the optical parameter of the lens comprises the optical cylinder in a visual reference zone of the optical lens; and/or the optical parameter of the lens comprises the optical cylinder axis in a visual reference zone of the optical lens; and/or the optical parameter of the lens comprises the prism base in a visual reference zone of the optical lens; and/or the optical parameter of the lens comprises the prism axis in a visual reference zone of the optical lens; and/or the optical parameter of the lens comprises the type of optical design of the optical lens; and/or the optical parameter of the lens comprises the transmittance of the optical lens; and/or the optical parameter of the lens comprises the color of the optical lens; and/or the optical parameter of the lens comprises the position of the optical center on the lens.

A further object of the disclosure is a calibration method for determining the relative position of an image acquisition module reference frame and flash of a portable electronic device, the calibration method comprises:

providing a known pattern, taking at least one image of the known pattern with the image acquisition module and the associated flash, determining the image acquisition module position and orientation in the known pattern reference frame, processing the at least one image of the known pattern taken using the flash so as to locate the flash reflection in the image, finding the coordinate of the reflection on the known pattern plan by calculating the intersection of the plan and the epiline of the flash reflection point in the image, determining the relative position of the flash and a reference point of the image acquisition module based on the coordinate of the reflection of the flash.

According to further embodiments of the optical device according to the disclosure which can be considered alone or in combination:

the method further comprises:
providing a known pattern, using an image of the known pattern from the image acquisition module of the portable electronic device from a first position, providing at least one indication to the user to move the portable electronic device relative to the known pattern to at least a second position different from the first position, taking an image of said known pattern in the second position using said image acquisition module, processing the image of the known pattern taken from the second position to determine at least parameters of the portable electronic device comprising the image acquisition module used to take the image; and/or the method further comprises prior to taking the image of said the known pattern in the second position checking stability of the portable electronic device, for example using pose estimation; and/or the method further comprises repeating the steps of providing at least one indication to the user to move with the portable electronic device to at least a different position and taking an image of the said known pattern from at least two, for example three, different positions; and/or the distance between the portable electronic device and the known pattern is substantially the same when taking an image of said known pattern in the different positions; and/or the method further comprises comprising processing in real-time each image of the known pattern from the image acquisition module to determine the at least one indication to be provided to the user to move the portable electronic device to a different position; and/or the indication provided to the user comprises a rotation indication and/or a translation indication; and/or the translation indication comprises an indication of which direction the user is to move the portable electronic device; and/or the rotation indication comprises an indication of if the orientation of the portable electronic device is to be changed; and/or the display is adapted to display images acquired by the image acquisition module in really-time and the indication provided to the user comprises an overlaid indication to be superimpose with indications corresponding to the possible next position; and/or the method further comprises prior to taking an image of the known pattern providing an estimate of the focal value of the image acquisition module; and/or the estimate of the focal value of the image acquisition module is estimated by taking an image of flat known rectangular element with the image acquisition module and processing the image by identifying two vanishing points, assuming that the focal of the image acquisition module is the same in all directions and that the center of the image acquisition module corresponds to the center of the acquired image; and/or the portable electronic device further comprises at least an inertia sensor and/or a magnetic sensor and the method further comprises gathering data using said inertia sensor and/or a magnetic sensor at least when taking an image of the known pattern; and/or the portable electronic device further comprises at least an inertia sensor and/or a magnetic sensor and the method further comprises gathering a data using said inertia sensor and/or a magnetic sensor when having the user move between two positions; and/or the inertia sensor comprises an accelerometer; and/or the portable electronic device comprises an accelerometer, the known pattern is in a fixed position and the method further comprises determining the at least one angle, for example the angles, between the image acquisition module reference frame and the accelerometer reference frame by:

receiving the set of images of the known pattern from the image acquisition module from different positions and each image being associated with a gravity data corresponding to the measurement of the gravity by the accelerometer expressed in the accelerometer reference frame, determining the at least one angle, for example the angles, between the image acquisition module reference frame and the known pattern reference frame based on the received images of the set of images, determining the at least one angle, for example the angles, between the image acquisition module reference frame and the accelerometer reference frame based on the determined at least one angle, for example angles, between the image acquisition module reference frame and the known pattern reference frame and assuming the gravity measured by the accelerometer is the same for each image; and/or the portable electronic device comprises a plurality of image acquisition modules and the method further comprises identify the image acquisition module used during the calibration method by:

taking an image of the known pattern placed on a reflective plan surface, the user facing the reflective plan surface when taking the image in a position so that the different image acquisition modules appear on the image, determining the used image acquisition module by knowing the relative position of the image acquisition module used to take the image and the known pattern and computing the estimate position of the reflect of the image acquisition module on the reflective plan surface; and/or the portable electronic device is to be used to determine at least one of optical fitting parameters of a user, optical parameters of an optical lens, acuity parameters of a user; and/or the portable electronic device is a smartphone, a personal digital assistant, a laptop, a webcam or a tablet computer; and/or the fitting parameters comprises the distance between the center of both pupil of the eyes of the user; and/or the fitting parameters comprises the distances between the center of each pupil and the sagittal plan of the user, and/or the fitting parameters comprises an indication of the high of the center of each pupil of the user, and/or the fitting parameters comprises indication of the shape of the nose of the use; and/or the fitting parameters comprises indication of the shape of the cheekbone of the user; and/or the optical parameter of the lens comprises the dioptric function of the optical lens; and/or the optical parameter of the lens comprises the optical power in a visual reference zone of the optical lens; and/or the optical parameter of the lens comprises the optical cylinder in a visual reference zone of the optical lens; and/or the optical parameter of the lens comprises the optical cylinder axis in a visual reference zone of the optical lens; and/or the optical parameter of the lens comprises the prism base in a visual reference zone of the optical lens; and/or the optical parameter of the lens comprises the prism axis in a visual reference zone of the optical lens; and/or the optical parameter of the lens comprises the type of optical design of the optical lens; and/or the optical parameter of the lens comprises the transmittance of the optical lens; and/or the optical parameter of the lens comprises the color of the optical lens; and/or the optical parameter of the lens comprises the position of the optical center on the lens.

Another object of the disclosure is a computer program product comprising one or more stored sequences of instructions which, when executed by a processing unit, are able to perform the parameter determining step of the method according to the disclosure.

The disclosure further relates to a computer program product comprising one or more stored sequences of instructions that are accessible to a processor and which, when executed by the processor, causes the processor to carry out at least the steps of the method according to the disclosure.

The disclosure also relates to a computer-readable storage medium having a program recorded thereon; where the program makes the computer execute at least the steps of the method of the disclosure.

The disclosure further relates to a device comprising a processor adapted to store one or more sequences of instructions and to carry out at least steps of the method according to the disclosure.

BRIEF DESCRIPTION OF THE DRAWINGS

Non limiting embodiments of the disclosure will now be described, by way of example only, and with reference to the following drawings in which.

Figure 1:
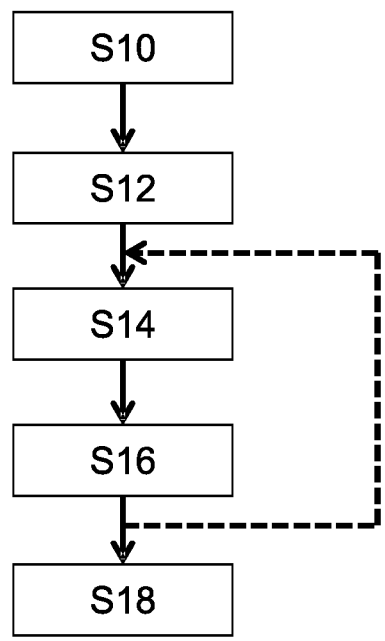
FIG. 1 is a flowchart of a calibration method according to the disclosure.

Elements in the figures are illustrated for simplicity and clarity and have not necessarily been drawn to scale. For example, the dimensions of some of the elements in the figure may be exaggerated relative to other elements to help improve the understanding of the embodiments of the present disclosure.

DETAILED DESCRIPTION OF THE DRAWINGS

The disclosure relates to a calibration method, for example at least partly implemented by computer means, for determining parameters of a portable electronic device comprising an image acquisition module to be used to determine parameters of a user, and a display, for example configured to display the images of the image acquisition module.

The portable electronic device may be a smartphone, a personal digital assistant, a laptop, or a tablet computer.

The image acquisition module may typically be a front or rear face camera of a smartphone or tablet computer or a webcam of a laptop.

The portable electronic device typically comprises a battery so as to allow portability.

The portable electronic device may comprise processing means that may be used to carry out at least part of the calibration method, for example the processing steps.

The portable electronic device may further comprise a communication module configured to communicate with a reception unit, for example by wireless communication. Such communication module may be used to send some of the images acquired using the image acquisition module to a distant entity comprising processing means configured to processing the images.

As explained in greater details hereafter, the portable electronic device may comprise many hardware sensors such as at least one camera, an accelerometer and eventually a flash.

Advantageously the calibration method shall consider not only the different sensors by themselves but also their interactions.

The calibration method of the disclosure allows not relying on the casing of the portable electronic device. This is significant because said casing could be used to simplify some of the calibration. Intuitively, it is easy to understand that a flat rectangular surface can be used as a spatial reference, providing a 3D axis system. Orientations can be compared to its orthogonal axis. Using this spatial reference simplifies some of the calibration but introduces new characteristics that are otherwise not necessary.

To implement the calibration method of the disclosure does not require knowing anything about the casing. Moreover, using the casing would add unnecessary constraints on the portable electronic device. In particular, some protection casing could prevent some portable electronic devices to be used.

The portable electronic device is intended to be used to determine parameters of the user after the calibration method of the disclosure has been carried out.

Typically, the portable electronic device is to be used to determine at least one of optical fitting parameters of a user, optical parameters of an optical lens, acuity parameters of a user.

As illustrated on FIG. 1, the calibration method of the disclosure comprises at least:
- a known pattern providing step S10,
- a image using step S12,
- an indication providing step S14,
- a image acquisition step S16, and
- a processing step S18.

The calibration method of the disclosure relies on the image acquisition module, for example a camera, to get information about the physical world in order to drive a data acquisition process.

At any time, the position and orientation of the image acquisition module are determined, and simple indication are given to the user implementing the calibration method.

During the known pattern providing step S10, a known pattern is provided in a 3D position, for example in a fix 3D position.

The known pattern can be a flat surface either a printed image or a displayed image using a display device. A chessboard pattern is commonly used. It could be any known 2D pattern including QR codes.

The known pattern may also be a 3D object. In particular, but not limited to, it can be the clip used to perform the lens fitting in the existing application or a simple chessboard pattern as illustrated on FIG. 2.

Figure 2:
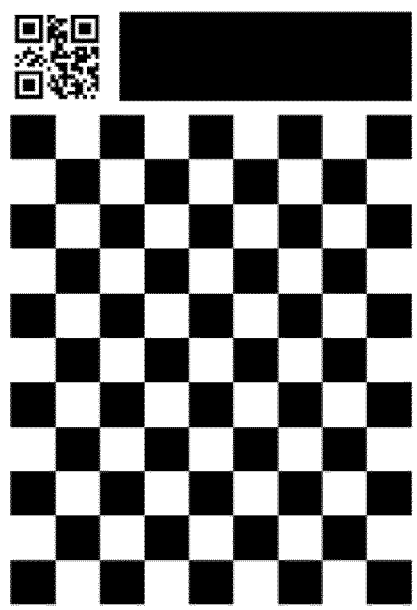
FIG. 2 is an example of known pattern that may be used to implement the calibration method.

As illustrated on FIG. 2, the known pattern may comprise a QR code to facilitate the identification of the pattern used, in other words the pattern can be automatically identified based on the QR code without having the user identified the pattern. The QR code may also be used to make sure the pattern is upside-down.

During the calibration method the user is required to move the portable electronic device in the 3D space capturing along the way static and dynamic data that are used to determine parameters of the portable electronic device.

The position and orientation of the portable electronic device may be determined using a standard computer vision technique called pose estimation. Using a simplified camera model, the pinhole model, and knowing specific information about a rigid physical object in the field of vision, it is possible to figure out the 6 degrees of freedom (3 for the position, 3 for the orientation).

This requires identifying known landmarks on a known pattern on the 2D image and performing an optimization algorithm to find the best values for the 6 parameters so that the relative position of these landmarks in 3D are correctly projected on the 2D image.

In particular, during the image using step S12, an image of the known pattern in the position is from the image acquisition module of the portable electronic device from a first position is used.

In the sense of the disclosure, when the position of the known pattern is fixed, it is fixed relative to the local gravity direction.

In the sense of the disclosure, taking a picture may comprise real-time images such as video and may include, but is not limited to, the fact of taking a single picture that is stored in a memory for processing.

At least one indication is provided to the user to move with the portable electronic device to at least a second position different from the first position during the indication providing step S14.

During the image acquisition step S16, an image of said known pattern in the second position is taken using said image acquisition module.

Prior to the image acquisition step, the method according to the disclosure may comprise checking the stability of the portable electronic device.

The image of the known pattern taken from the second position is processed during the processing step S18 to determine at least parameters of the image acquisition module used to take the image.

The calibration method of the disclosure may comprise repeating the steps of providing at least one indication to the user to move with the portable electronic device to at least a different position and taking an image of the said known pattern from at least two, for example three, different positions, preferably eight different positions.

Preferably, the distance between the portable electronic device and the known pattern is substantially the same when taking an image of said known pattern in all the different positions.

The indication provided to the user during the indication providing step S14 may be determined by processing, in real-time, each image of the known pattern from the image acquisition module to determine the at least one indication to be provided to the user to move the portable electronic device to the different position.

Such processing may be based on the well-known pinhole camera model that allows to go back and forth between the 2D representation— the images—and the 3D world.

The indication provided to the user may comprise a rotation indication and/or a translation indication.

The position of the portable electronic device is defined by 6 degrees of liberty, the 3 rotations (roll, pitch and yaw) and the 3 translations.

However, it would be very difficult to give simple indication to the user to control these 6 degrees. To make it easier for the user, as detailed below, it is possible to only provide indications for the 3 translations, considering that he handles the 3 rotations by pointing the camera toward the known pattern.

The translation indication may comprise an indication of which direction the user is to move the portable electronic device.

The rotation indication may comprise an indication of if the orientation of the portable electronic device is to be changed.

Typically, the user is asked to point the image acquisition module toward the known pattern. To make it easier for the user, the portable electronic device may be configured to provide real-time feedback, for example using the display of the portable electronic device. This feedback can be provided with a color overlay on the display to provide a clear indication if the orientation of the portable electronic device is correct or is to be changed, for example the screen is green when the orientation is correct, red otherwise.

Typically, when the orientation of the portable electronic device is correct, translation indication may be provided as well, such as "move to the right", "move closer". These movements can be simple cartesian movements (move closer to the plan holding the known pattern) or more naturally can be polar movements (move closer to the known pattern).

Preferably, the indication is provided in real time. For example, the display of the portable electronic device provides real-time images provided by the image acquisition module and over the real-time images indications are provided to the user to where a next position is. The user may be provided with indications of different possible next positions and may choose the next position, for example the most convenient for him.

The indication may be provided to the wearer as augmented reality information. For example, the indication may overlay the display of the real-time images acquired by the image acquisition module to provide a very simple and intuitive experience to the user. The indications may be indication of the current position of the portable electronic device and indication the possible next positions of the portable electronic device. Such positions may be identified by showing squares over the real-world real-time image. Some of the squares are predefined position squares each of which corresponds to a position from which a picture of the known pattern may be taken. A real-time position square corresponds to the current position of the portable electronic device. The user is to superimpose the real-time position square with one of the predefined positions squares.

Figure 3:
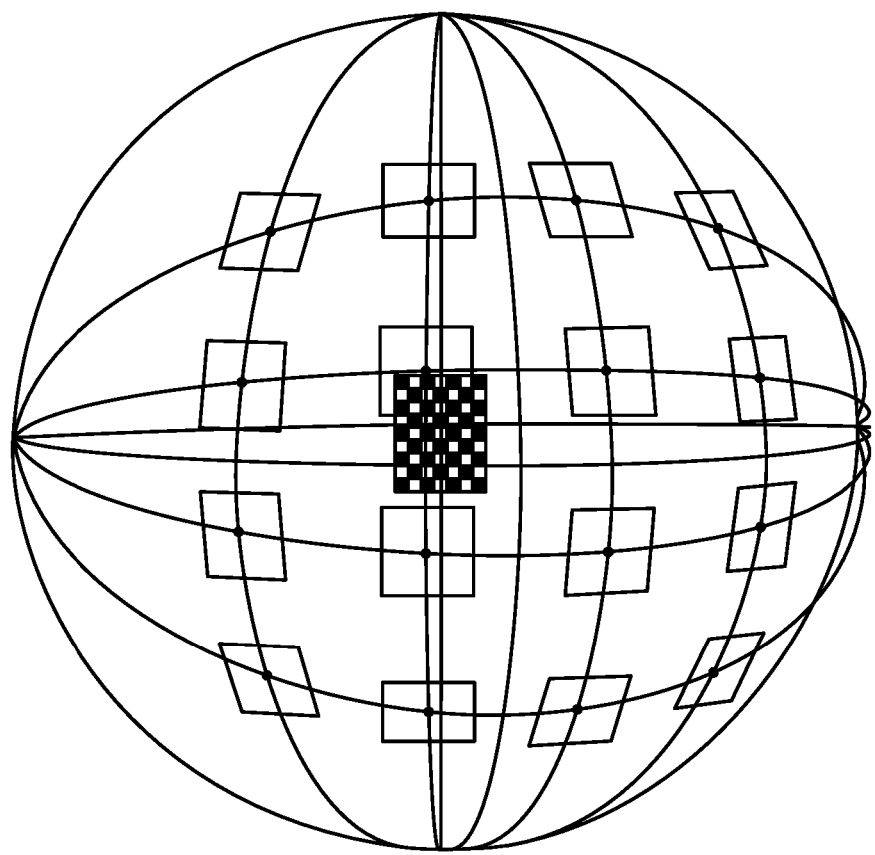
FIG. 3, is an example of different predefined position around a known pattern.

FIG. 3 provides an example of different predefined positions around a known pattern.

The pinhole model used when processing the acquired images is defined by some parameters of the image acquisition module, such as the image acquisition module intrinsic parameters and the distortion parameters.

The image acquisition module intrinsic parameters are the focal values (fx and fy) along both axis and the position of the center of the sensor (cx and cy). The distortion parameters are the radial and tangential distortion coefficients.

All these parameters are among the parameters that may be determined (or checked) during the calibration method.

However, the calibration method may require some preliminary knowledge of at least part of these intrinsic parameters to work.

This preliminary knowledge can be known in advance or estimated.

The center of the sensor of the image acquisition module can be assumed to be at the center of the images. This is not strictly true but is a good enough estimate for the calibration method according to the disclosure.

The initial focal values can be determined by asking the portable electronic device operating system. In practice, some portable electronic devices provide no values or incorrect values. The initial focal value may also be extracted from an online database. However, this database may be incomplete or inaccurate.

An alternative method is to estimate the initial focal values.

To this end the calibration method according to the disclosure may comprise prior to taking an image of the known pattern providing an estimate of the focal value of the image acquisition module.

The traditional approach for focal estimation is to perform a full image acquisition module calibration. This requires taking multiple pictures of a known object from different point of view.

The number of points of views can be reduced or any point of view can be considered but it degrades the calibration significantly and more importantly it causes significant reproducibility issues. Indeed, the result depends on the operator understanding of the needed points of view.

For the calibration method of the disclosure a property of the perspective deformation of a rectangular flat object on a picture is used.

Typically, the focal values of the image acquisition module are estimated by taking an image of flat known rectangular element with the image acquisition module and processing the image by identifying two vanishing points, assuming that the focal of the image acquisition module is the same in all directions and that the center of the image acquisition module corresponds to the center of the acquired image.

For estimating the focal values of the image acquisition module, the method of the disclosure uses a property of the perspective deformation of a rectangular flat object on an image.

This is well described in the article "A Practical Camera Calibration System on Mobile Phones" from Lu Bo, TaegKeun Whangbo from 2014. Figure in the article shows the rectangular flat surface in the 3D world (L1,L2,L3,L4) on the top right, the 2D of it (I1,I2,I3,4) on the middle and the property between the two vanishing points A and B and the optical center 0.

The two vanishing points, A and B, must verify the following equation:

$$\frac{(c_x - a_x)(c_x - b_x)}{f_x^2} + \frac{(c_y - a_y)(c_y - b_y)}{f_y^2} + 1 = 0$$

where A=($a_x$, $b_x$) and B=($b_x$, $b_y$).

The previous equation comprises four unknown parameters (fx, fy, cx, cy) and is true for any image with some perspective.

With four different images, one may obtain four equations and can determine the four unknown parameters.

To simplify this estimation even more, when implementing the method according to the disclosure, one may assume that the center of the sensor is at the center of the image ($c_x$=W/2, $c_y$=H/2) and that the focal is the same on both axis ($f_x$=$f_y$). Advantageously, this assumption allows determining the parameters from a single image and has proven to provide a good enough estimate of the parameters for the implementation of the rest of the calibration method of the disclosure.

With this simplification, all parameters can be determined from a single image based on the following equation:

$$f=\sqrt{(c_x-a_x)(b_x-c_x)+(c_y-a_y)(b_y-c_y)}$$

The inventors have defined an acceptability criterion that is to be verified to assure that the determined parameters based on a single result are accurate enough for the calibration method of the disclosure.

The inventors have observed that the criteria need to make sure that the estimation is taken from a point of view providing enough perspective.

This criterion is that the distance between the two vanishing points dAB should be less than a few times the size of the image and pose estimation using the estimated focal to add the resulting point of view. Intuitively, it means that the perspective deformation is strong enough to bring the vanishing point closer.

Alternatively, the inventors found that doing a 1-picture traditional image acquisition module calibration with a simplified model (fixed optical center and no distortion) is another robust focal estimation method as long as they had enough perspective.

According to an aspect of the disclosure, the portable electronic device further comprises at least an inertia sensor and/or a magnetic sensor and the method further comprises gathering data using said inertia sensor and/or a magnetic sensor at least when taking an image of the known pattern.

Advantageously during the processing step S18, parameters relating to the inertia sensor and/or a magnetic sensor of the portable electronic device may be determined so as to used when determining optical parameters using the portable electronic device.

According to an aspect of the disclosure, the portable electronic device further comprises at least an inertia sensor and/or a magnetic sensor and the method further comprises gathering a data using said inertia sensor and/or a magnetic sensor when having the user move between two positions.

For example, the calibration method of the disclosure may comprise gathering inertia sensor and/or a magnetic sensor data when having the user move between two positions.

The inertia sensor and/or a magnetic sensor data may be processed to determine intrinsic parameters of the inertia sensor and/or a magnetic sensor but also to determine the interaction between the inertia sensor and/or a magnetic sensor and other hardware components of the portable electronic device, such as the image acquisition module.

The inertia sensor may comprise an accelerometer.

In particular of determining some parameter of a user using a portable electronic device having an image acquisition module and an accelerometer it may be of great importance to know the orientation or at least one angle, for example the angles, between the image acquisition module and the accelerometer.

One could assume that the image acquisition module and the accelerometer are aligned, but this introduce a measurement error that is directly proportional to the misaligned angle (this is a first-degree error).

Figure 4:
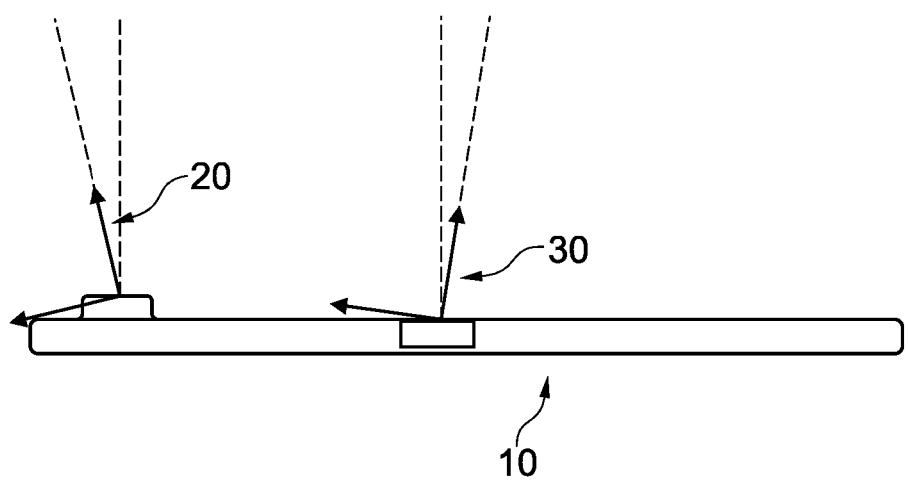
FIG. 4 illustrates the image acquisition module frame and accelerometer frame according to an aspect of the disclosure.

FIG. 4 illustrates a 2D representation of the misalignment of the image acquisition module reference frame 20 and the accelerometer reference frame 30 in the case of a smartphone 10.

Figure 5:
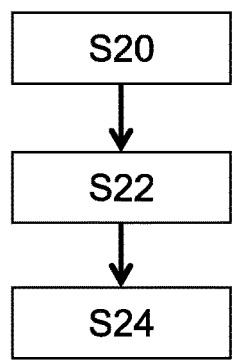
FIG. 5 is a flowchart of a method according to the disclosure.

As illustrated on FIG. 5, so as to determine the at least one angle, for example the angles, between the image acquisition module reference frame and the accelerometer reference frame the calibration method according to the disclosure may comprise:
 a receiving step S20,
 a first angle determining step S22, and
 a second angle determining step S24.

During the receiving step S20, a set of images of a known pattern in a fixed position from the image acquisition module from different positions and each image being associated with a gravity data corresponding to the measurement of the gravity by the accelerometer expressed in the accelerometer reference frame are received.

The set of images may correspond to images taken when carrying out step S10 to S16 of the calibration method according to the disclosure. However, the set of images may be provided using a different acquisition method.

The determination of the at least one angle, for example the angles, between the image acquisition module reference frame and the accelerometer reference frame according to the disclosure is based on considering the gravity field as homogenous (which is true at this level of scale and precision), in other words the gravity observed by the accelerometer is considered fixed with respect to the world.

Since the orientation of the image acquisition module camera in the known pattern reference frame (the world coordinates) can be determined, one can transform the gravity vector determined by the accelerometer to express it in the world frame reference. This requires taking into account the rotation between the accelerometer and the image acquisition module.

During the first angle determining step S22 the at least one angle, for example the angles, between the image acquisition module reference frame and the known pattern reference frame are determined based on the received images of the set of images.

Then during the second angle determining step S24, the at least one angle, for example the angles, between the image acquisition module reference frame and the accelerometer reference frame are determined based on the determined at least one angle, for example angles, between the image acquisition module reference frame and the known pattern reference frame and assuming the gravity measured by the accelerometer is the same for each image.

The gravity data enable to determine the orientation of the horizontal plane in the real word.

Figure 6:
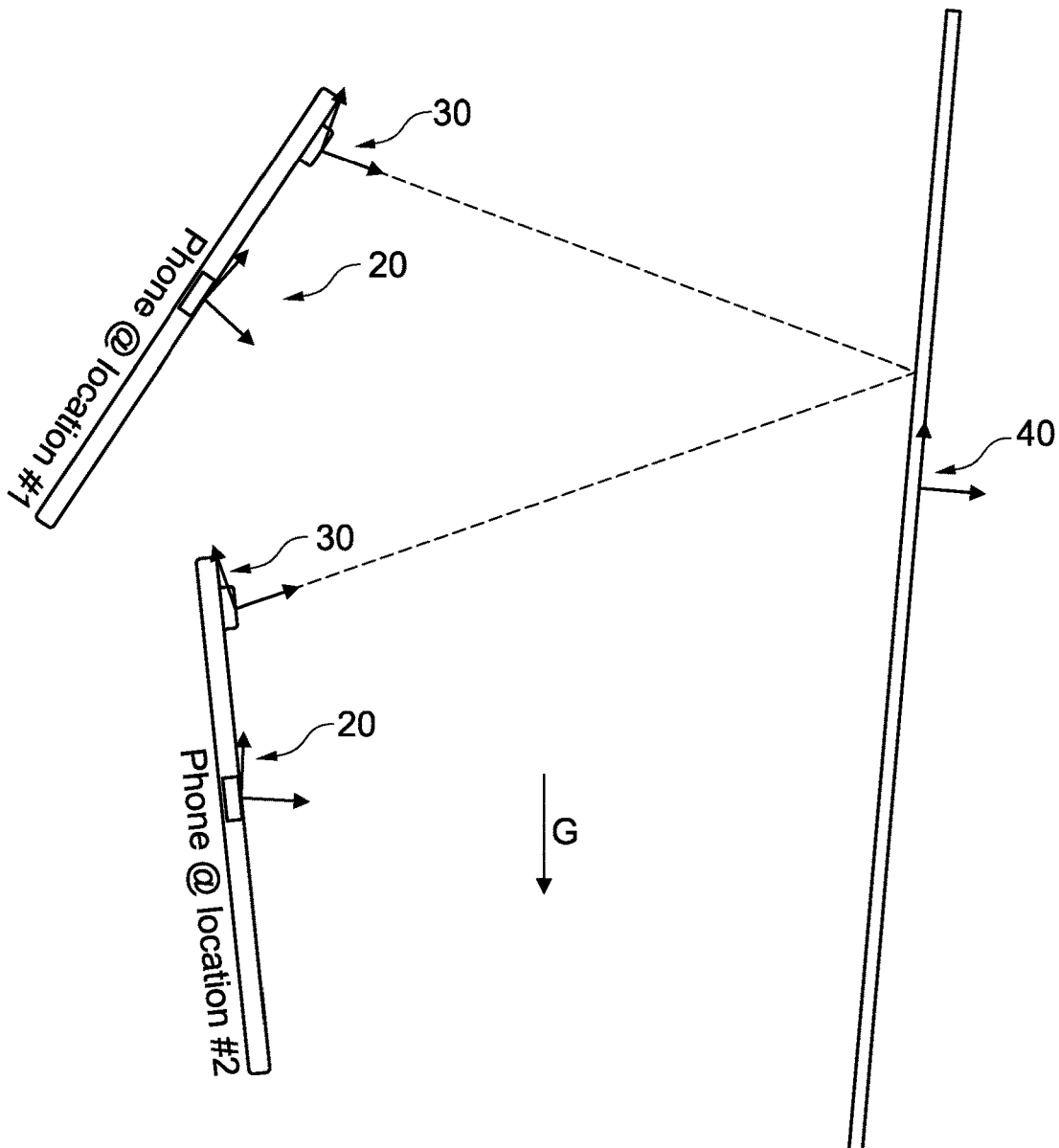
FIG. 6 is a simplified 2D illustration of the determination of at least one angle between the image acquisition module reference frame and the accelerometer reference frame.

FIG. 6 is a simplified 2D illustration of the determination of the at least one angle, for example the angles, between the image acquisition module reference frame and the accelerometer reference frame. This helps understand the rotation application.

But it is really a 3D problem that can be formulated as an equation:

$$\forall j,k \ G_{20}{}^j \cdot \overline{R}_{20 \to 30} \cdot \overline{R}_{30 \to 40}{}^j = G_{20}{}^k \cdot \overline{R}_{20 \to 30} \cdot \overline{R}_{30 \to 40}{}^k$$

where $G_{20}^j$ is the gravity observed by the accelerometer 20, $R_{20\to30}$ is the 3D rotation (unknown but constant) between the accelerometer 20 and the image acquisition module 30 and $R_{30\to40}$ is the 3D rotation between the image acquisition module 30 and the known pattern 40.

This equation is true for any set of two points of view. The unknown rotation can be characterized by 3 parameters. We can have as many equations as needed. The problem is therefore solvable by optimization.

According to an embodiment of the disclosure, the portable electronic device further comprises a flash associated to the image acquisition module.

It may be of interest to determine with precision the relative position of the flash associated with the image acquisition module.

Therefore, the calibration method according to the disclosure may further comprise determining the relative position of the flash and a reference point, for example the center, of the image acquisition module.

The determination of the relative position of the flash and a reference point of the image acquisition module, the calibration method may comprise:
  taking at least one image of the known pattern with the image acquisition module and the associated flash,
  determining the image acquisition module position and orientation in the known pattern reference frame,
  processing the at least one image of the known pattern taken using the flash so as to locate the flash reflection in the image, for example using traditional image processing methods or AI-based methods,
  finding the coordinate of the reflection on the known pattern plan by calculating the intersection of the plan and the epiline of the flash reflection point in the image,
  determining the relative position of the flash and a reference point of the image acquisition module based on the coordinate of the reflection of the flash.

Figure 7:
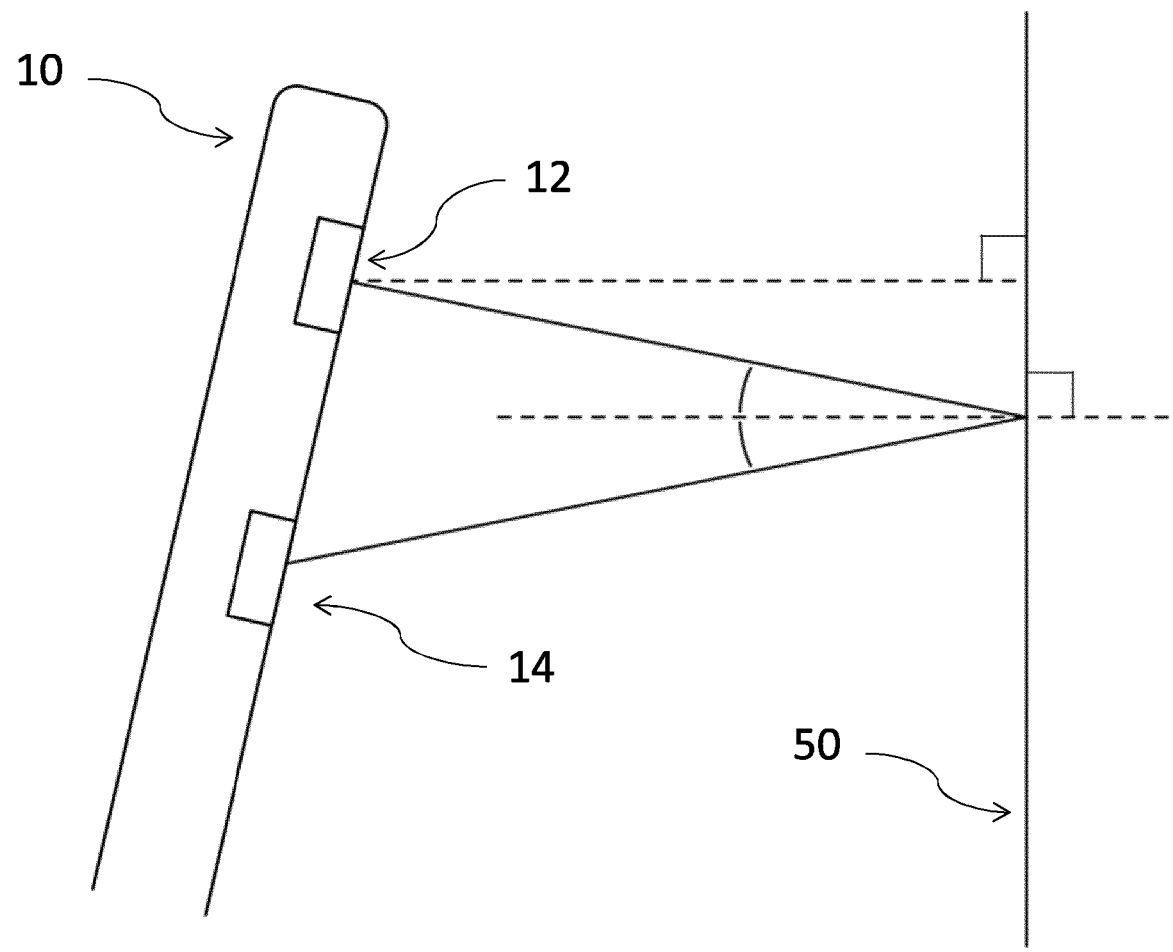
FIG. 7 illustrates how the relative position of the image acquisition module and a flash may be determined.

The determination of the relative position of the flash and a reference point of the image acquisition module may be done using the well-known Snell-Descartes law on reflection as illustrated on FIG. 7. On FIG. 7, a portable device 10 comprising an image acquisition module 12 and a flash 14 is place before a mirror 50 so as to determine the relative position of the flash and the image acquisition module using a method of the disclosure.

So as to help determine the relative position of the flash and a reference point of the image acquisition module the known pattern may comprise a reflexive area that facilitates the reflection detection. The reflective characteristic of this area is known and well adapted. Advantageously, this helps narrowing the search of the flash reflection to this area.

Advantageously, the position of the flash reflection on the known pattern may be used for determining parameters of a portable electronic device comprising an image acquisition module, such as the position of the flash with respect to the image acquisition module.

The calibration method may be further improved by using multiple images from multiple positions (point of view), updating a heatmap of candidate relative positions and in the end using the most likely position.

This reduces the errors caused by the 3D reconstruction.

If the multiple pictures are taken with a fixed-pattern, this further improvement cancels the false-positive reflection detections that occur when the surrounding environment produces spots on the fixed-pattern plan. The flash is the only source leading to a fixed relative position.

Some portable electronic devices may comprise a plurality of acquisition modules and it may not always be very intuitive to know which acquisition module has been used when carryout the calibration method.

For example, when using a portable electronic device to determine lens fitting, the spectacle wearer needs to look at the camera during the fitting measurement. Therefore, there is a need to know which camera is being used.

Therefore, there may be a need to identify the image acquisition module used during the calibration method.

During the data gathering steps, we know, at any time, the position and orientation of the image acquisition module relative to the known pattern. Placing the known pattern on a plane reflective surface allows to determine the estimated position of the reflect of the image acquisition module on the plane reflective surface, for example by projecting orthogonally the camera on the mirror. We can then zoom and crop this image that shows the identified image acquisition module. This zoomed image may be used later to indicate during the lens fitting measurement which image acquisition module is to be considered.

In other words, the calibration method may comprise:
  taking an image of the known pattern placed on a reflective plan surface, for example a plan mirror, the user facing the reflective plan surface when taking the image in a position so that the different image acquisition modules appear on the image,
  determining the used image acquisition module by knowing the relative position of the image acquisition module used to take the image and the known pattern and computing the estimate position of the reflect of the image acquisition module on the reflective plan surface.

The disclosure has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A calibration method for determining parameters of a portable electronic device comprising an image acquisition module to be used to determine parameters of a user and a display, the method comprising:
  using an image of a known pattern from the image acquisition module of the portable electronic device from a first position;
  providing at least one indication to the user to move the portable electronic device relative to the known pattern to at least a second position different from the first position;
  taking an image of the known pattern in the second position using the image acquisition module; and
  processing the image of the known pattern taken from the second position to determine at least the parameters of the portable electronic device comprising the image acquisition module used to take the image, wherein the portable electronic device comprises a plurality of image acquisition modules, and the method further comprises identifying one of the plurality of image acquisition modules used during the calibration method by:

taking an image of the known pattern placed on a reflective plan surface, the user facing the reflective plan surface when taking the image in a position so that different image acquisition modules appear on the image, and determining the used image acquisition module by knowing a relative position of the image acquisition module used to take the image and the known pattern and computing an estimate position of a reflection of the image acquisition module on the reflective plan surface.

2. The method according to claim 1, further comprising prior to taking the image of the known pattern in the second position checking a stability of the portable electronic device.

3. The method according to claim 1, further comprising repeating providing at least one indication to the user to move with the portable electronic device to at least a different position and taking an image of the known pattern from at least two different positions.

4. The method according to claim 1, further comprising processing in real-time each image of the known pattern from the image acquisition module to determine the at least one indication to be provided to the user to move the portable electronic device to a different position.

5. The method according to claim 1, wherein the at least one indication provided to the user comprises at least one of a rotation indication and a translation indication.

6. The method according to claim 5, wherein the translation indication comprises an indication of which direction the user is to move the portable electronic device.

7. The method according to claim 5, wherein
the display is adapted to display images acquired by the image acquisition module in real-time, and
the at least one indication provided to the user comprises an overlaid indication to be superimposed with indications corresponding to a possible next position.

8. The method according to claim 1, further comprising prior to taking the image of the known pattern providing an estimate of a focal value of the image acquisition module.

9. The method according to claim 1, wherein
the portable electronic device further comprises at least one of an inertia sensor and a magnetic sensor, and
the method further comprises gathering data using at least one of the inertia sensor and the magnetic sensor at least when taking the image of the known pattern.

10. The method according to claim 1, wherein
the portable electronic device further comprises at least one of an inertia sensor and a magnetic sensor, and
the method further comprises gathering data using at least one of the inertia sensor and the magnetic sensor when having the user move between two positions.

11. The method according to claim 9, wherein the inertia sensor comprises an accelerometer.

12. The method according to claim 1, wherein the portable electronic device further comprises an accelerometer, the known pattern is in a fixed position, and the method further comprises determining at least one angle between an image acquisition module reference frame and an accelerometer reference frame by:

receiving a set of images of the known pattern from the image acquisition module from different positions and each image being associated with a gravity data corresponding to a measurement of a gravity by the accelerometer expressed in the accelerometer reference frame, determining the at least one angle between the image acquisition module reference frame and a known pattern reference frame based on the received images of the set of images, and determining the at least one angle between the image acquisition module reference frame and the accelerometer reference frame based on the determined at least one angle between the image acquisition module reference frame and the known pattern reference frame and assuming the gravity measured by the accelerometer is the same for each image.

13. The method according to claim 1, wherein the portable electronic device further comprises a flash associated to the image acquisition module and the method further comprises determining a relative position of the flash and a reference point of the image acquisition module by:

taking at least one image of the known pattern with the image acquisition module and the associated flash, determining an image acquisition module position and orientation in a known pattern reference frame, processing the at least one image of the known pattern taken using the flash so as to locate a flash reflection in the at least one image, finding a coordinate of a reflection of the flash on a known pattern plan by calculating an intersection of the known pattern plan and an epiline of a flash reflection point in the at least one image, and determining the relative position of the flash and the reference point of the image acquisition module based on the coordinate of the reflection of the flash.

14. The method according to claim 1, wherein the portable electronic device is configured to determine at least one of optical fitting parameters of the user, optical parameters of an optical lens, and acuity parameters of the user.

* * * * *